(12) United States Patent
Kamio

(10) Patent No.: US 8,155,376 B2
(45) Date of Patent: Apr. 10, 2012

(54) IMAGE PROCESSOR, IMAGE FORMING APPARATUS, IMAGE PROCESSING METHOD AND COMPUTER READABLE MEDIUM

(75) Inventor: Mitsugu Kamio, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 959 days.

(21) Appl. No.: 12/146,036

(22) Filed: Jun. 25, 2008

(65) Prior Publication Data
US 2009/0103771 A1    Apr. 23, 2009

(30) Foreign Application Priority Data
Oct. 22, 2007  (JP) ................................. 2007-273571

(51) Int. Cl.
*G06K 9/00* (2006.01)
(52) U.S. Cl. .......... 382/100; 713/176; 399/366; 283/93; 283/901; 283/902; 380/201; 386/252; 386/260
(58) Field of Classification Search .................. 382/100; 713/176; 399/366; 283/93, 901, 902; 380/201; 386/252, 260
See application file for complete search history.

(56) References Cited

U.S. PATENT DOCUMENTS

| | | | |
|---|---|---|---|
| 6,427,020 B1 * | 7/2002 | Rhoads .......................... | 382/100 |
| 6,731,774 B1 * | 5/2004 | Hosaka et al. ................. | 382/100 |
| 7,227,661 B2 | 6/2007 | Matsunoshita | |
| 7,847,958 B2 * | 12/2010 | Ishikura ........................ | 358/1.14 |
| 8,023,742 B2 * | 9/2011 | Brown et al. .................. | 382/195 |
| 2002/0085671 A1 * | 7/2002 | Sakaida ....................... | 378/98.11 |
| 2009/0091802 A1 * | 4/2009 | Brown et al. .................. | 358/466 |

FOREIGN PATENT DOCUMENTS

| | | | |
|---|---|---|---|
| JP | 2003-283790 A | 10/2003 | |
| JP | 2007-166333 A | 6/2007 | |

OTHER PUBLICATIONS

Notification of Reasons for Refusal Japanese Office Action corresponding to Japanese Patent Application No. 2007-273571 dated, Oct. 13, 2009.

* cited by examiner

*Primary Examiner* — Andrew W Johns
*Assistant Examiner* — Shefali Goradia
(74) *Attorney, Agent, or Firm* — Sughrue Mion, PLLC

(57) ABSTRACT

The image processor includes: an acquisition unit acquiring a read-out image read out by an image reading apparatus; a detection unit detecting, from the read-out image, an embedded image including a first specified image having a first shape and a second specified image having a second shape; an adding unit adding attribute information to a specified region in the embedded image, in accordance with an appearance ratio of the first specified image in the specified region, and adding attribute information to other region surrounding the specified region, in accordance with an appearance ratio of the first specified image in the other region; and a determination unit determining whether or not the specified region is to be subjected to a predetermined processing using the first specified image based on whether or not the attribute information added to the specified region corresponds to the attribute information added to the other region.

10 Claims, 14 Drawing Sheets

FIG.1A  INHIBITION CODE ARRAY 0
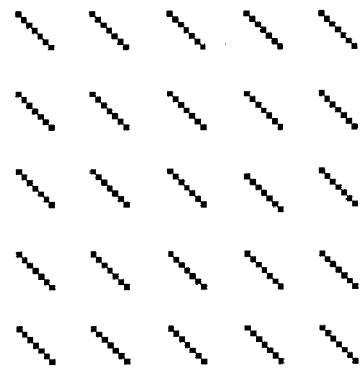
FIG.1B  INHIBITION CODE ARRAY 1
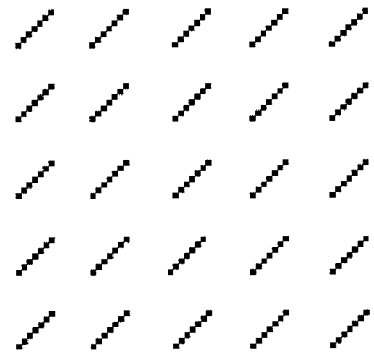
FIG.1C  CONDITION CODE ARRAY
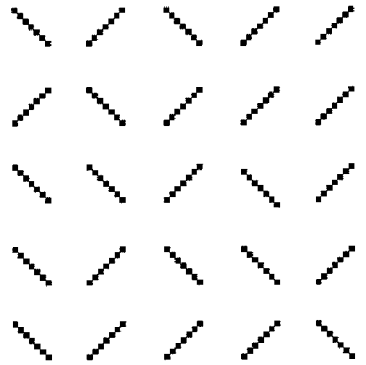

FIG.7A

| | D | D | D | 0 | D | D | D | D | 1 |
|---|---|---|---|---|---|---|---|---|---|
| | D | D | D | 1 | D | D | D | D | 0 |
| | D | D | 1 | 1 | 1 | D | D | 0 | 0 |
| | 0 | 1 | 1 | 1 | 1 | 1 | 0 | 0 | 0 |
| | D | D | 1 | 1 | 1 | D | D | 0 | 0 |
| | D | D | D | 1 | D | D | D | D | 0 |
| | D | D | D | 0 | D | D | D | D | 1 |
| | D | D | 0 | 0 | 0 | D | D | 1 | 1 |
| | D | 0 | 0 | 0 | 0 | 0 | 1 | 1 | 1 |

FIG.7B

| | D | D | D | 0 | D | D | D | D | 1 |
|---|---|---|---|---|---|---|---|---|---|
| | D | D | D | 1 | D | D | D | D | 0 |
| | D | D | 1 | 1 | 1 | D | D | 0 | 0 |
| | 0 | 1 | 1 | 1 | 1 | 1 | 0 | 0 | 0 |
| | D | D | 1 | 1 | 1 | D | D | 0 | 0 |
| | D | D | D | 1 | D | D | D | D | 0 |
| | D | D | D | 0 | D | D | D | D | 1 |
| | D | D | 0 | 0 | 0 | D | D | 1 | 1 |
| | D | 0 | 0 | 0 | 0 | 0 | 1 | 1 | 1 |

IMAGE PROCESSOR, IMAGE FORMING APPARATUS, IMAGE PROCESSING METHOD AND COMPUTER READABLE MEDIUM

CROSS REFERENCE TO RELATED APPLICATIONS

This application is based on and claims priority under 35 USC §119 from Japanese Patent Application No. 2007-273571 filed Oct. 22, 2007.

BACKGROUND

1. Technical Field

The present invention relates to an image processor, an image forming apparatus, an image processing method and a computer readable medium storing a program.

2. Related Art

There are some techniques known to prevent unauthorized copying when an image of an original document is read out by a copying apparatus.

SUMMARY

According to an aspect of the invention, there is provided an image processor including: an acquisition unit that acquires a read-out image read out by an image reading apparatus; a detection unit that detects, from the read-out image acquired by the acquisition unit, an embedded image including a first specified image having a first shape and a second specified image having a second shape; an adding unit that adds attribute information to a specified region in the embedded image detected by the detection unit, in accordance with an appearance ratio of the first specified image in the specified region, and that adds attribute information to other region surrounding the specified region in the embedded image detected by the detection unit, in accordance with an appearance ratio of the first specified image in the other region; and a determination unit that determines whether or not the specified region is to be subjected to a predetermined processing using the first specified image on the basis of whether or not the attribute information added to the specified region corresponds to the attribute information added to the other region.

BRIEF DESCRIPTION OF THE DRAWINGS

Exemplary embodiment (s) of the present invention will be described in detail based on the following figures, wherein:

FIGS. 1A to 1C are enlarged images each taken from a part of such an embedded image;

FIGS. 7A and 7B each illustrate an example of the size and the shape of the determination frame in such a case;

DETAILED DESCRIPTION

Figure 2:
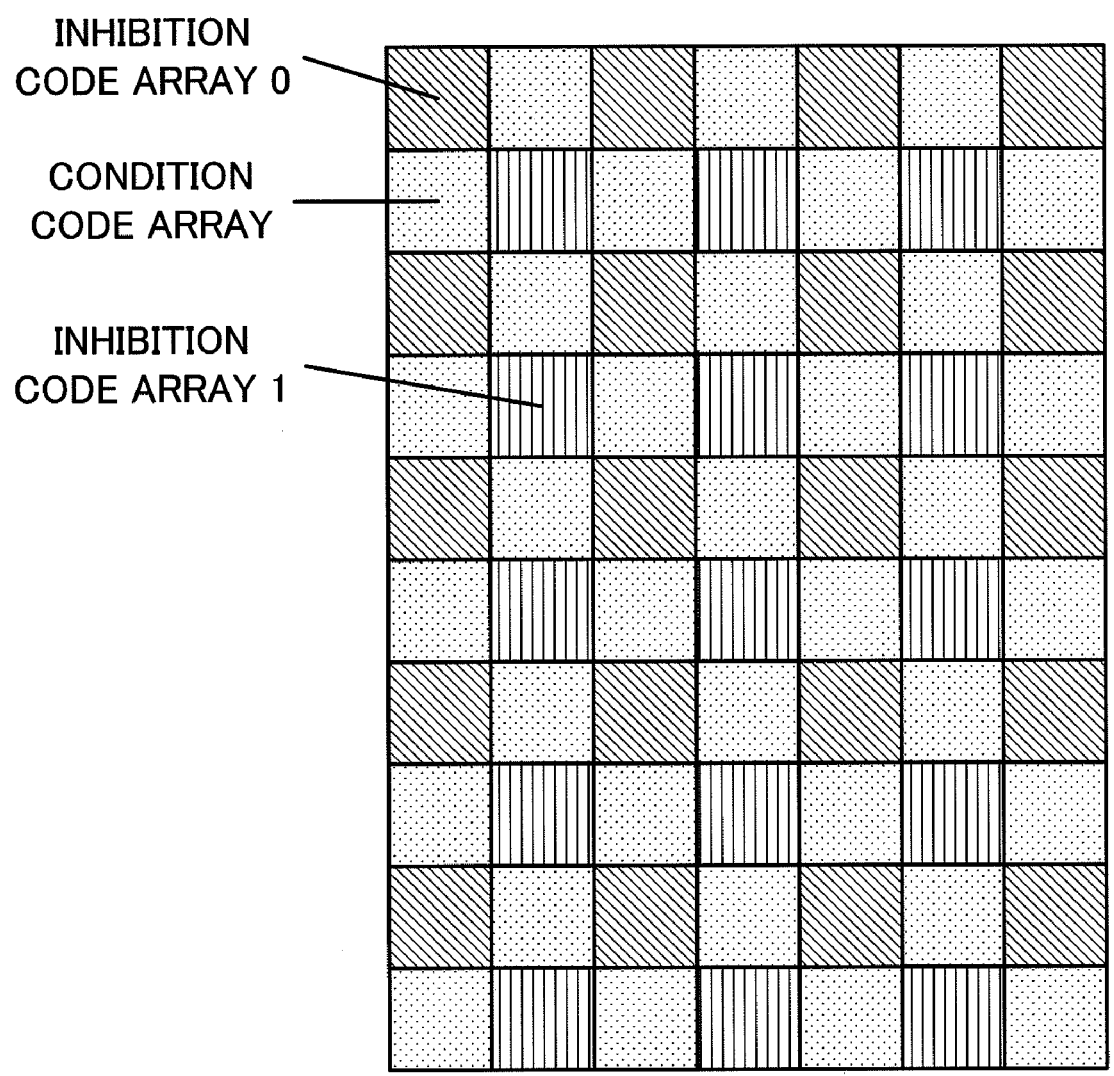
FIG. 2 is a diagram illustrating an example of a layout of the embedded image.

In the following section, exemplary embodiments for carrying out the present invention will be described in detail with reference to attached drawings.

First, a description will be given of an embedded image that is superimposed on a document image, and then printed out on a medium, such as a sheet of paper, in the present exemplary embodiment.

FIGS. 1A to 1C are enlarged images each taken from a part of such an embedded image.

As shown in the figures, the embedded image is composed of pattern images including patterns of diagonal strokes falling from left to right or patterns of diagonal strokes rising from left to right. In the present exemplary embodiment, the pattern of the diagonal stroke falling from left to right represents a bit "0," while the pattern of the diagonal stroke rising from left to right represents a bit "1." The size of the individual pattern images is configured to be in a range of 12 pixels both in a main scanning direction and in a sub scanning direction.

It should be noted that the term "medium" used in this specification may refer to any kind of medium as long as an image is printable on the medium, and the material thereof is not limited. The material of the "medium", although represented by paper, maybe an OHP sheet, a metal plate, cloth or the like.

In the following section, images illustrated in FIGS. 1A to 1C will be described.

First, FIG. 1A illustrates an image representing an inhibition code array 0. In the present case, the inhibition code array 0 is a code array composed of only bits "0." Since the pattern of the diagonal stroke falling from left to right represents a bit "0" in the present exemplary embodiment, an image representing the inhibition code array 0 only contains the patterns of the diagonal strokes falling from left to right. In such a configuration, inhibition information for inhibiting a predetermined processing is embedded by using the inhibition code array 0. In the case of a copying operation of an original document as an example of the predetermined processing, the inhibition information is information to be used for inhibiting copying of the original document.

FIG. 1B illustrates an image representing an inhibition code array 1. In the present case, the inhibition code array 1 is a code array composed of only bits "1." Since the pattern of the diagonal stroke rising from left to right represents a bit "1" in the present exemplary embodiment, an image representing the inhibition code array 1 only contains the patterns of the diagonal strokes rising from left to right. In such a configuration, inhibition information for inhibiting a predetermined processing is embedded by using the inhibition code array 1.

In the case of a copying operation of an original document as an example of the predetermined processing, the inhibition information is information to be used for inhibiting copying of the original document.

In the meantime, FIG. 1C illustrates an image representing a condition code array. In the present case, the condition code array is composed of both bits "0" and bits "1." In the present exemplary embodiment, the pattern of the diagonal stroke falling from left to right represents a bit "0," while the pattern of the diagonal stroke rising from left to right represents a bit "1." Accordingly, the image representing the condition code array contains both the patterns of the diagonal strokes falling from left to right and the patterns of the diagonal strokes rising from left to right. In such a configuration, condition information indicating a condition for releasing an inhibition of a predetermined processing is embedded into the condition code array. In the case of a copying operation of an original document as an example of the predetermined processing, the condition information is information indicating a condition for releasing the inhibition of the copying operation of the original document. In such a case, a password, a user ID, date, a serial number of a copying apparatus and the like are exemplified as the condition information.

It should be noted that the inhibition information and the condition information may be hereinafter collectively referred to as "control information."

FIG. 2 is a diagram illustrating an example of a layout of the embedded image.

In the figure, a diagonally hatched rectangle represents a region into which the inhibition code array 0 illustrated in FIG. 1A is embedded (this region is hereinafter referred to as "an inhibition region 0"), a vertically hatched rectangle represents a region into which the inhibition code array 1 illustrated in FIG. 1B is embedded (this region is hereinafter referred to as "an inhibition region 1"), and a dot-hatched rectangle represents a region into which the condition code array illustrated in FIG. 1C is embedded (this region is hereinafter referred to as "a condition region"). Hereinafter, the inhibition region 0, the inhibition region 1 and the condition region may be collectively referred to as "a control region."

In this layout, for example, 20 pattern images both in a main scanning direction and in a sub scanning direction are arranged in each of the control regions.

In this case, the layout of the embedded image is not limited to that illustrated in FIG. 2. For example, the layout may include the inhibition regions 0 and the inhibition regions 1 that are alternately arranged both in the main scanning direction and in the sub scanning direction in the absence of the condition region.

In the present exemplary embodiment, as illustrated in FIGS. 1A to 1C, the control information is embedded into the embedded image by periodically arranging minute pixel clusters. In the meantime, in some cases, images detected as minute pixel clusters, such as halftone dots, may be included in a similar cycle as the pixel clusters of the control information in the document image that is printed out after the embedded image is superimposed on the document image. In such a case, the pixel clusters in the document image may be erroneously detected as the pixel clusters of the control information. As a result, even though the read-out original document is not a copy-inhibited document, an action for inhibiting a copying operation may be performed.

In this case, while the size of the individual control regions should be equal to or smaller than a predetermined size as shown in FIG. 2, the size of a region including the pixel clusters, such as halftone dots, is generally bigger than the predetermined size.

Therefore, in the present exemplary embodiment, by focusing on such size difference, it is configured that a region in which the pixel clusters detected as the control information sequentially exist in a relatively large area is not to be identified as a region into which the control information is embedded.

Next, a description will be given of a copying apparatus 10 in which such an operation is carried out.

Figure 3:
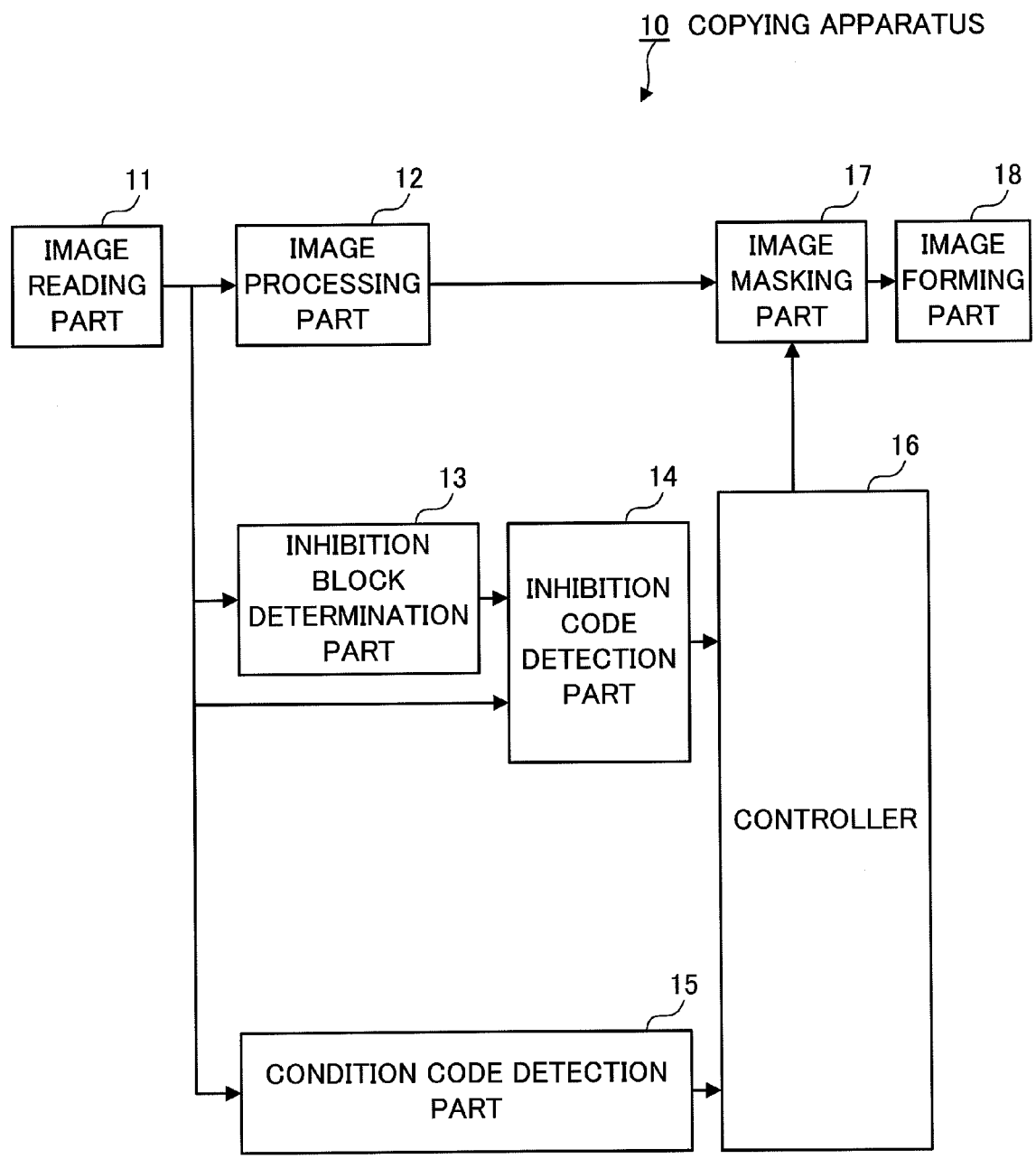
FIG. 3 is a block diagram illustrating a configuration example of the copying apparatus.

FIG. 3 is a block diagram illustrating a configuration example of the copying apparatus 10.

As shown in the figure, the copying apparatus 10 is provided with an image reading part 11, an image processing part 12, an inhibition block determination part 13, an inhibition code detection part 14, a condition code detection part 15, a controller 16, an image masking part 17 and an image forming part 18.

The image reading part 11 obtains image data by, for example, reading out an image printed on an original document. In this case, the image reading part 11 is, for example, a scanner, and the scanner may have a charge coupled device (CCD) configuration or a contact image sensor (CIS) configuration. In the charge coupled device (CCD) configuration, a reflected light derived from a light emitted from a light source and illuminating an original document is reduced by a lens and then received by CCDs, while in the contact image sensor (CIS) configuration, a reflected light derived from a light emitted from each LED light source and sequentially illuminating an original document is received by a CIS. In the present exemplary embodiment, the image reading part 11 is provided as an example of a reading unit that reads out an image.

The image processing part 12 performs a predetermined image processing on image data inputted from the image reading part 11.

The inhibition block determination part 13 divides a code array represented by image data inputted from the image reading part 11 into blocks, and determines whether or not each of the blocks is to be subjected to inhibition code detection. In the present exemplary embodiment, the inhibition block determination part 13 is provided as an example of a determination unit that determines whether or not a specified region is to be subjected to the detection.

The inhibition code detection part 14 divides a code array represented by image data inputted from the image reading part 11 into blocks, and detects an inhibition code in a block, among the blocks, which has been determined, by the inhibition block determination part 13, to be subjected to the inhibition code detection. In the present exemplary embodiment, the inhibition code detection part 14 is provided as an example of a detection unit that detects a region.

The condition code detection part 15 divides a code array represented by image data inputted from the image reading part 11 into blocks, and detects a condition code in the blocks.

The controller 16 outputs a signal for instructing the image masking part 17 to, for example, paint over an image on the basis of output from the inhibition code detection part 14 and the condition code detection part 15. In the present exemplary embodiment, the controller 16 is provided as an example of a restricting unit that restricts an image from being printed on other medium.

The image masking part 17 performs a processing for painting over the image which has been subjected to the image processing by the image processing part 12, when the signal for instructing to paint over the image is outputted from the controller 16.

The image forming part 18 forms an image on a recording medium, such as paper. In this case, the image forming part 18 is, for example, a printer, and the printer may uses an electrophotographic method in which an image is formed by transferring toner attached to a photoconductor to a recording medium, or an inkjet method in which an image is formed by ink jetting onto a recording medium.

In the following section, the operation of the copying apparatus 10 will be described.

In the copying apparatus 10, first, image data obtained as a result of reading of an original document image by the image reading part 11 is outputted to the image processing part 12, the inhibition block determination part 13, the inhibition code detection part 14 and the condition code detection part 15.

Then, the image processing part 12 performs a predetermined image processing on the image data outputted from the image reading part 11, and outputs the image data to the image masking part 17.

Meanwhile, the inhibition block determination part 13 outputs, to the inhibition code detection part 14, information indicating whether or not each of the blocks of the code array represented by the image data outputted from the image reading part 11 is to be subjected to the inhibition code detection. The detailed operation of the inhibition block determination part 13 will be described later.

Then, the inhibition code detection part 14 detects an inhibition code from the image data outputted from the image reading part 11.

In this section, the operation of the inhibition code detection part 14 will be described.

Figure 4:
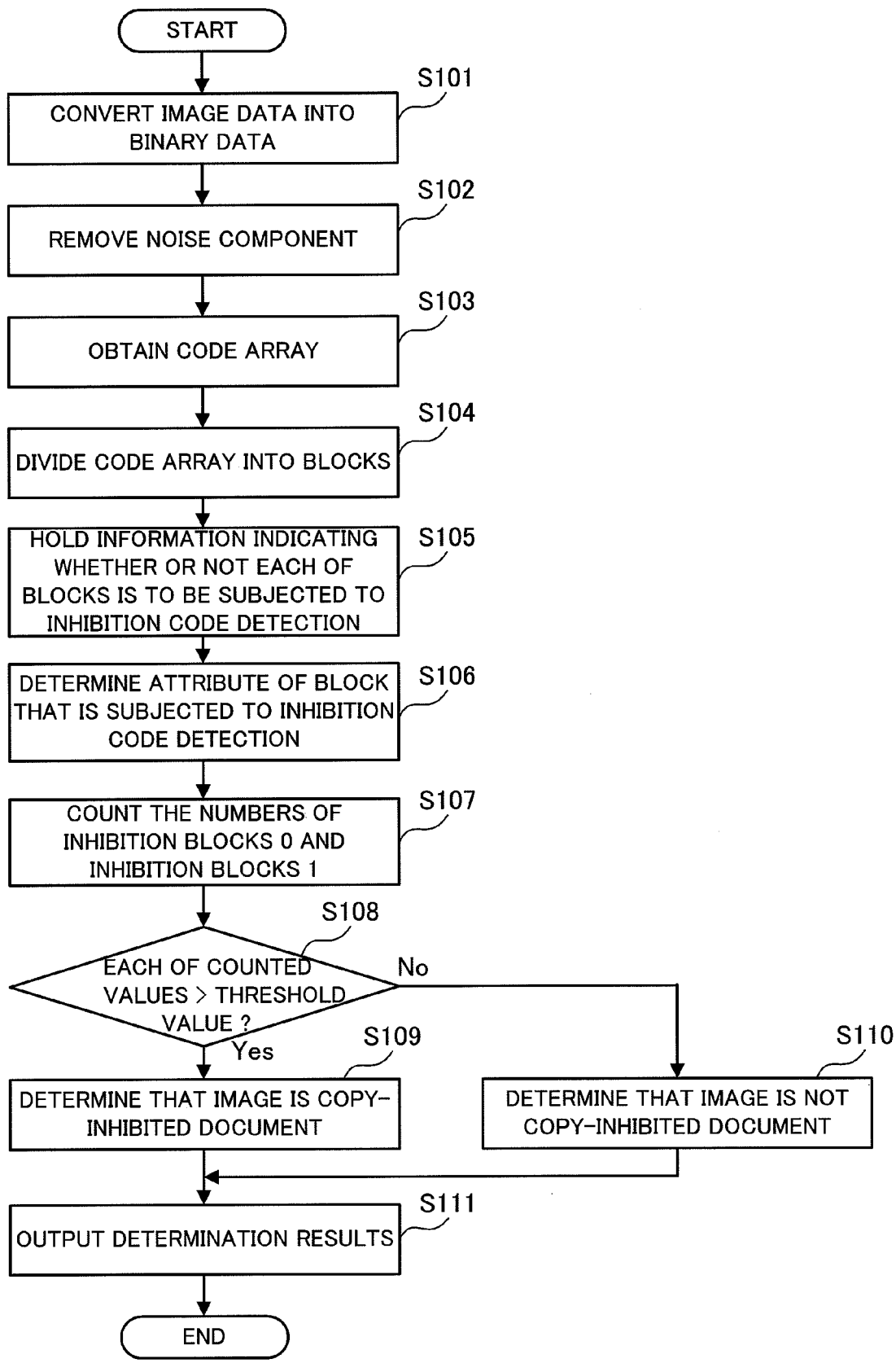
FIG. 4 is a flowchart illustrating an operation example of the inhibition code detection part.

FIG. 4 is a flowchart illustrating an operation example of the inhibition code detection part 14.

The inhibition code detection part 14 first converts image data inputted from the image reading part 11 into binary data of "0" or "1" (step 101). Then, a noise component included in the binary data is removed (step 102). In this step, for example, pixel clusters in each of which black pixels are connected each other are obtained. Then, each of the pixels in a pixel cluster, among the pixel clusters obtained as described above, having a size not in a predetermined size range is replaced with a white pixel. The predetermined range may be set to a range such that a diagonal pattern is not erased, and, for example, an isolated dot pattern is erased.

Next, the inhibition code detection part 14 detects two kinds of pattern images illustrated in FIGS. 1A to 1C in an image from which the noise has been removed, and replaces the individual pattern images with a bit "0" or a bit "1" to obtain a code array (step 103). For example, the pattern of the diagonal stroke falling from left to right and the pattern of the diagonal stroke rising from left to right, which each serve as a reference, are sequentially assigned to a position of each of the pixels in the image expressed by binary data, and a pattern image is detected by template matching. Then, in the case where the pattern images illustrated in FIGS. 1A to 1C are used, a bit "0" is outputted when the pattern of the diagonal stroke falling from left to right is detected, while a bit "1" is outputted when the pattern of the diagonal stroke rising from left to right is detected. It should be noted that a detailed description of a pattern image detection method by template matching is omitted since the method is based on a publicly-know technique.

Thereafter, the inhibition code detection part 14 divides the code array composed of bits "0" or bits "1" into small regions (blocks) each having a predetermined size (step 104). For example, the size of the individual blocks is set to a size smaller than half the size of the individual control regions so that one or more blocks are fully contained in each of the control regions.

The code array is divided into plural blocks as described above. In the present exemplary embodiment, the inhibition block determination part 13 determines, in a processing which will be described later, whether or not each of the blocks is to be subjected to the inhibition code detection, and then outputs the result of the determination to the inhibition code detection part 14. Then, in response to the determination result, the inhibition code detection part 14 holds information indicating whether or not each of the blocks is to be subjected to the inhibition code detection (step 105).

Furthermore, the inhibition code detection part 14 determines an attribute of a block that has been determined to be subjected to the inhibition code detection in step 105 (step 106). The attribute of the block in this case indicates whether the block is an inhibition block 0 containing a large number of bits "0," an inhibition block 1 containing a large number of bits "1," or a condition block containing both bits "0" and bits "1." In this configuration, first, in the block that is to be subjected to the inhibition code detection, the numbers of bits "0" and bits "1" are respectively calculated, and a total sum of the numbers is also calculated. Then, on the basis of the ratio of bits "0" calculated from the number of bits "0" and the total sum, the attribute of the block is determined.

At this point, in the case where a target block is located inside of the inhibition area 0, the number of bits "0" detected in the block is equal to or more than a predetermined number, and a bit "1" is hardly detected. Accordingly, the ratio of bits "0" is high. When the ratio 100% to 0% is expressed as 1.0 to 0.0, respectively, the ratio of bits "0" should be very close to 1.0.

Further, in the case where a target block is located inside of the inhibition area 1, the number of bits "1" detected in the block is equal to or greater than a predetermined number and a bit "0" is hardly detected. Accordingly, the ratio of bits "0" is low and should be very close to 0.0.

Furthermore, in the case where a target block is located inside of the condition area, since plural bits "0" and plural bits "1" are detected in the block, the ratio of bits "0" should be much lower than 1.0 and much higher than 0.0.

In the case where the image data outputted from the image reading part 11 corresponds to an original document image into which control information is embedded, plural bits "0" and plural bits "1" should be embedded into the block.

The inhibition code detection part 14 determines the attribute of the block by using such characteristics in the following process:

1) In the case where the total number of the pattern images is greater than a threshold value Th1, and the ratio of bits "0" is greater than a threshold value Th2, the block belongs to the inhibition region 0.
2) In the case where the total number of the pattern images is greater than the threshold value Th1, and a value in which one (1) minus the ratio of bits "0" is greater than the threshold value Th2, the block belongs to the inhibition region 1.
3) In the case where neither 1) nor 2) is applicable, the block does not belong to any inhibition region.

The threshold value Th1 may be set by calculating the number of the pattern images theoretically included in the block on the basis of the size of the block and the size of the control region, and then by allowing for a margin for the number. The threshold value Th2 is set to a value close to 1.0 (for example, the threshold value Th2 is set to 0.95).

Next, the inhibition code detection part 14 counts the numbers of the inhibition blocks 0 and the inhibition blocks 1 separately (step 107). Thereafter, these counted values are each compared to a threshold value Th3 (step 108). In this case, the threshold value Th3 maybe adjusted accordingly depending on the number of the kinds of the inhibition codes.

As a result, in the case where the number of the inhibition blocks 0 is equal to or greater than the threshold value Th3, and the number of the inhibition blocks 1 is equal to or greater than the threshold value Th3, it is determined that the image is a copy-inhibited document (step 109). In the case other than the above case, it is determined that the image is not a copy-inhibited document (step 110). Then, the determination results are individually outputted to the controller 16 (step 111).

In the meantime, the condition code detection part 15 detects a condition code in the image data outputted from the image reading part 11.

Incidentally, the condition code detection processing is the same as the inhibition code detection processing except for the following points.

As a first point, it is necessary to consider a skew angle during reading of an original document while a condition code is being detected. If the original document has been rotated by 90 degrees, the pattern of the diagonal stroke falling from left to right corresponding to a bit "0" is detected as the pattern of the diagonal stroke rising from left to right corresponding to a bit "1," while the pattern of the diagonal stroke rising from left to right corresponding to a bit "1" is detected as the pattern of the diagonal stroke falling from left to right corresponding to a bit "0." Accordingly, even if a bit "0" and a bit "1" are reversed to each other, the determination whether or not the document is a copy-inhibited document does not be affected. However, when the condition code is to be detected, erroneous information may be extracted if it is not accurately determined whether each of the pattern images represents a bit "0" or a bit "1."

As a second point, error correcting encoding is performed on the condition code in order to avoid an erroneous operation due to extraction of wrong information. Accordingly, it is necessary to perform an error correcting decoding processing for detection of the condition code.

As described above, in accordance with output from the inhibition code detection part 14, the controller 16 outputs, to the image masking part 17, a signal instructing to paint over the image when the original document is a copy-inhibited document, and a signal instructing to perform a regular copying operation without painting over the image when the original document is not a copy-inhibited document. The controller 16 may also output, to the image forming part 18, a signal instructing to terminate the copying operation when the original document is a copy-inhibited document. The controller 16 may also output a signal instructing to perform the copying operation if a predetermined condition is satisfied, in accordance with output from the condition code detection part 15.

In the following section, the inhibition block determination part 13 according to the present exemplary embodiment will be described. As having been described, the inhibition block determination part 13 notifies the inhibition code detection part 14 of the block that is to be subjected to the inhibition code detection. In the present exemplary embodiment, it is determined whether or not the block is to be subjected to the inhibition code detection by comparing the code array in the block and code arrays in respective blocks forming a frame surrounding the block.

In the following section, a first determination method and a second determination method will be described as a concrete determination method.

[First Determination Method]

Figure 5:
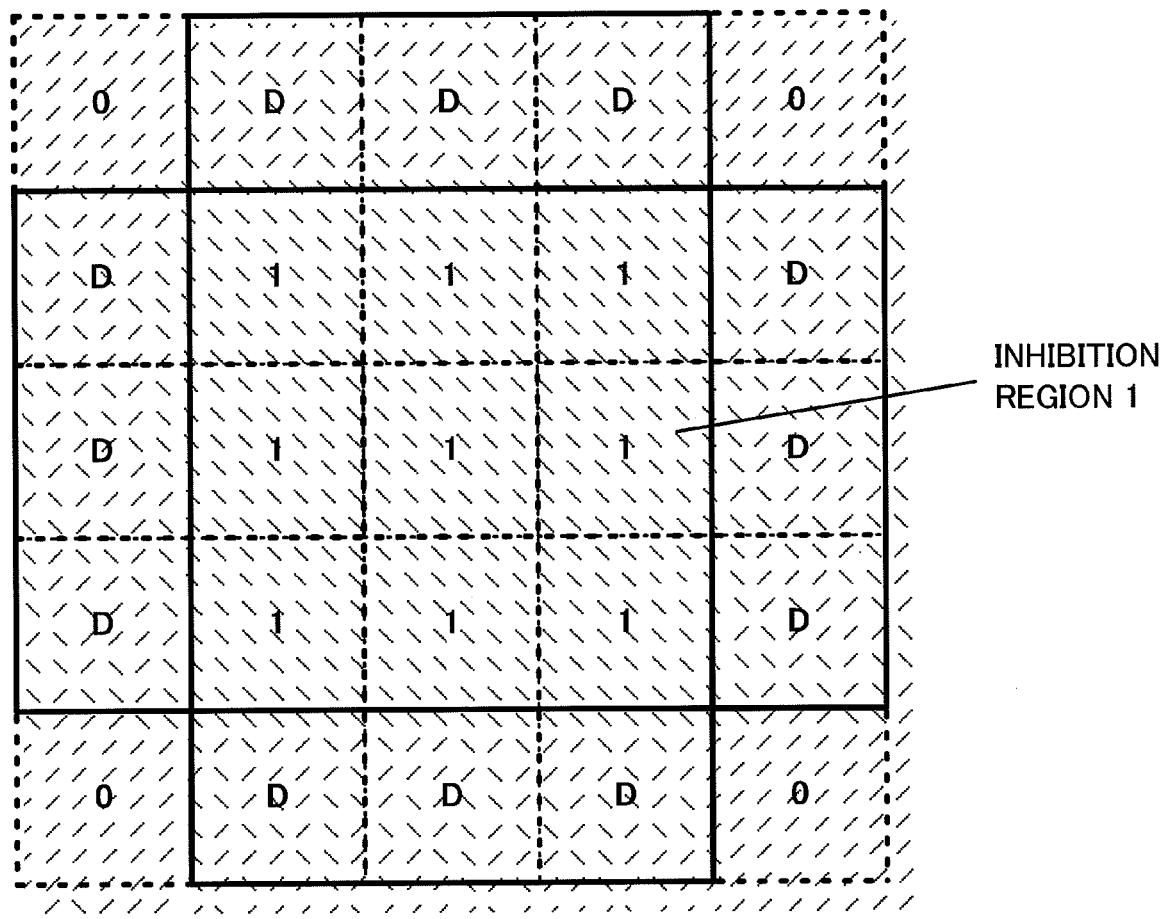
FIG. 5 is a diagram concretely illustrating an outline of a first determination method.

FIG. 5 is a diagram concretely illustrating an outline of a first determination method.

This figure illustrates a portion having the inhibition region 1 in the layout illustrated in FIG. 2 as a center. In this figure, the inhibition region 1 has a size of three blocks by three blocks. A determination frame surrounding the inhibition region 1 is composed of: three condition blocks in contact with the upper side of the inhibition region 1; three condition blocks in contact with the lower side of the inhibition region 1; three condition blocks in contact with the left side of the inhibition region 1; and three condition blocks in contact with the right side of the inhibition region 1. The determination frame is indicated by solid lines. In the meantime, each of the blocks is indicated by dotted lines.

In the first determination method, first, the ratio of bits "0" and the ratio of bits "1" in each of the blocks a calculated. In the case where the ratio of bits "0" in the block is equal to or greater than a threshold value, it is determined that the block is the inhibition block 0. On the other hand, in the case where the ratio of bits "1" in the block is equal to or greater than a threshold value, it is determined that the block is the inhibition block 1. When neither case is applicable to the block, it is determined that the block is the condition block. Thereafter, it is determined whether or not each of the blocks constituting the inhibition region is placeable within a determination frame having a predetermined size. It should be noted that the determination frame in this first determination method refers to a frame consisting of blocks each having a bit value other than that of the target block, as the attribute thereof. In the case illustrated in the figure, all the blocks in the inhibition region 1 are placeable within the determination frame (a frame consisting of any of inhibition blocks 0 and condition blocks); thus, these blocks are to be subjected to the inhibition code detection. If the block is not placeable within the determination frame, the block is excluded from the blocks subjected to the inhibition code detection.

In this case, the predetermined size is set to be three blocks by three blocks. However, a block may be determined to be subjected to the inhibition code detection when the block is placeable within a smaller determination frame.

In the following section, a concrete procedure to determine whether or not the block is placeable within the determination frame will be described.

FIGS. 6A to 6I are diagrams illustrating the concrete procedure.

Figure 6C:
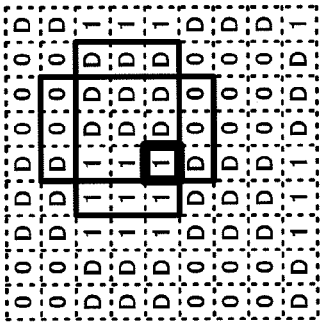
FIGS. 6A to 6I are diagrams illustrating the concrete procedure.
Figure 6F:
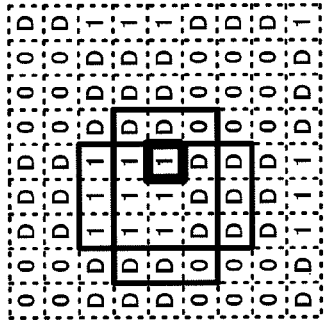
Figure 6I:
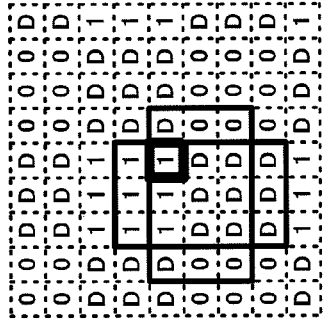
Figure 6B:
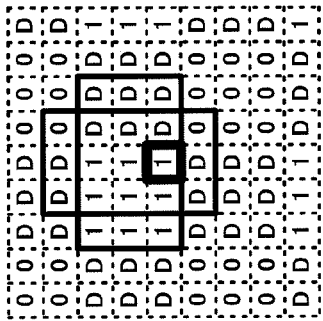
Figure 6E:
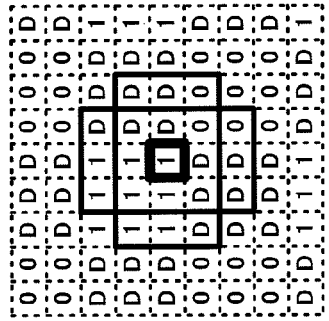
Figure 6H:
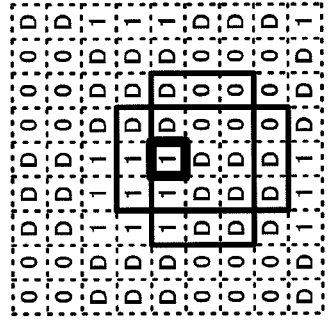
Figure 6A:
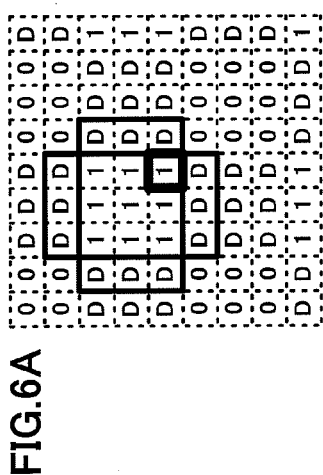
Figure 6D:
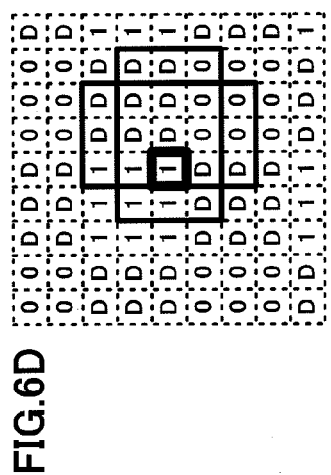
Figure 6G:
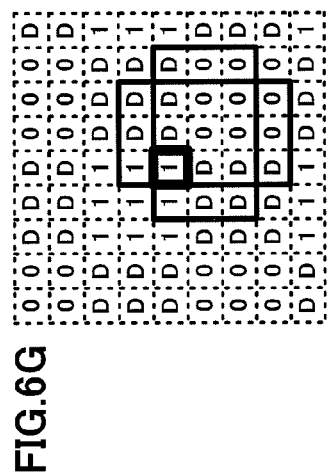

In all of FIGS. 6A to 6I, the target block is indicated by bold solid lines. A frame having a size of three blocks by three blocks indicated by fine solid lines is moved as shown in FIGS. 6A to 6I in order to determine whether or not the target block is placeable within the determination frame. As shown in the figures, when the frame is set as shown in FIG. 6A, the target block is the inhibition block 1, and the blocks constituting the frame are the condition blocks; thus, the target block is placeable within the determination frame. On the other hand, when the frame is set as shown in FIGS. 6B to 6I, the target block is the inhibition block 1, and the blocks constituting the frame include at least one inhibition block 1; thus, the target block is not placeable within the determination frame.

In some cases, an original document may be read out when the direction thereof is rotated.

FIGS. 7A and 7B each illustrate an example of the size and the shape of the determination frame in such a case.

FIG. 7A illustrates a first determination frame in the case where an original document having been rotated by 45 degrees is read out. In the figure, the first determination frame is indicated by fine solid lines. Having the similar shape to those illustrated in FIGS. 5 and 6A to 6I, the first determination frame is in contact with a square region at each of the sides thereof. Meanwhile, the size of the first determination frame is five blocks by five blocks which is larger than those illustrated in FIGS. 5 and 6A to 6I. In this configuration, the block indicated by thick lines in the figure is placeable within a determination frame constituted by blocks (each of which is either the inhibition block 0 or the condition block) each having a bit value other than that of the block indicated by the thick lines, as an attribute thereof. Therefore, the block indicated by the thick lines is to be subjected to the inhibition code detection.

It should be noted that a skew angle of an original document may be obtained, for example, on the basis of statistical information obtained by calculating angles of the pattern images (the patterns of the diagonal stroke falling from left to right or the patterns of the diagonal stroke rising from left to right) in pattern matching.

Meanwhile, FIG. 7B illustrates a second determination frame when an original document having been rotated by 45 degrees is read out. In the figure, the second determination frame is indicated by fine solid lines. The second determination frame has a shape along a square having been rotated by 45 degrees, which is different from those illustrated in FIGS. 5 and 6A to 6I. In this configuration, the block indicated by the thick lines in the figure is placeable within a determination frame constituted by blocks (each of which is either the inhibition block 0 or the condition block) each having a bit value other than that of the block indicated by the thick lines, as an attribute. Therefore, the block indicated by the thick lines is to be subjected to the inhibition code detection.

It should be noted that, although the determination frame is shown in the case where the original document having been rotated by 45 degrees is read out, as an example in this section, a skew angle of an original document in a reading process is not limited to 45 degrees. For example, a skew angle may be 22.5 degrees. With respect to any other angles, it may be approximated to 45 degrees or 22.5 degrees.

Here, a description will be given of the inhibition block determination part 13 in the case where the first determination method is adopted.

Figure 8:
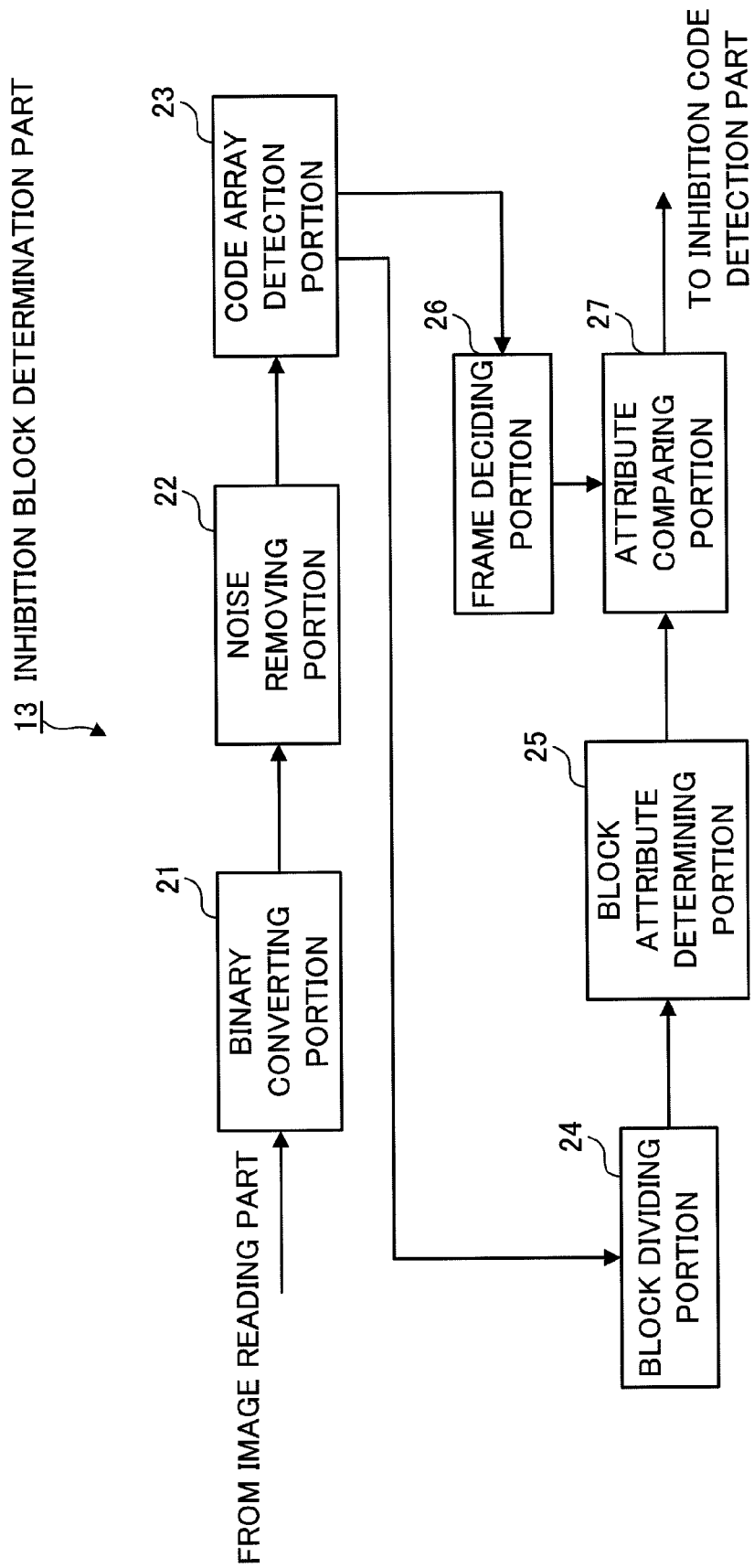
FIG. 8 is a block diagram illustrating a configuration example of the inhibition block determination part in this case.

FIG. 8 is a block diagram illustrating a configuration example of the inhibition block determination part 13 in this case.

As shown in the figure, the inhibition block determination part 13 is provided with a binary converting portion 21, a noise removing portion 22, a code array detection portion 23, a block dividing portion 24, a block attribute determining portion 25, a frame deciding portion 26 and an attribute comparing portion 27.

The binary converting portion 21 converts inputted image data into binary data, either "0" or "1," and outputs the converted data. In the present exemplary embodiment, the binary converting portion 21 is provided as an example of an acquisition unit that acquires a read-out image.

The noise removing portion 22 removes a noise component from the binary data outputted by the binary converting portion 21.

The code array detection portion 23 detects pattern images from the binary data from which the noise component has been removed by the noise removing portion 22, and detects a code array composed of bits "0," bits "1" or both by examining each of the pattern images whether it corresponds to the pattern of the diagonal stroke falling from left to right or the pattern of the diagonal stroke rising from left to right. In the present exemplary embodiment, the code array detection portion 23 is provided as an example of a detection unit that detects an embedded image as well as an example of a calculation unit that calculates a slope of the embedded image.

The block dividing portion 24 divides the code array detected by the code array detection portion 23 into blocks.

The block attribute determining portion 25 determines whether each of the blocks obtained by dividing the code array by the block dividing portion 24 is the inhibition block 0, the inhibition block 1 or the condition block, as an attribute. In the present exemplary embodiment, the block attribute determining portion 25 is provided as an example of an adding unit that adds attribute information to each of a specified region and other region.

The frame deciding portion 26 decides the shape and the size of a frame to be used for determining whether or not the block, which has been determined to be either the inhibition block 0 or the inhibition block 1 by the block attribute determining portion 25, is to be subjected to the inhibition code detection. In the present exemplary embodiment, the frame deciding portion 26 is provided as an example of a decision unit that decides at least any one of the shape and the size of other region.

The attribute comparing portion 27, while scanning, on the code arrays, the frame decided by the frame deciding portion 26, determines whether or not each of the blocks is placeable within the determination frame by comparing the attribute of the target block and the attribute of the individual blocks constituting the frame. Then, the attribute comparing portion 27 outputs determination results to the inhibition code detection part 14. In this case, the determination results are outputted region by region to the inhibition code detection part 14. Accordingly, the inhibition code detection part 14 recognizes whether or not the individual blocks constituting the region are to be subjected to the inhibition code detection. In the present exemplary embodiment, the attribute comparing portion 27 is provided as an example of a determination unit that determines whether or not the specified region is to be subjected to the predetermined processing.

In the following section, the operation of the inhibition block determination part 13 will be described.

Figure 9:
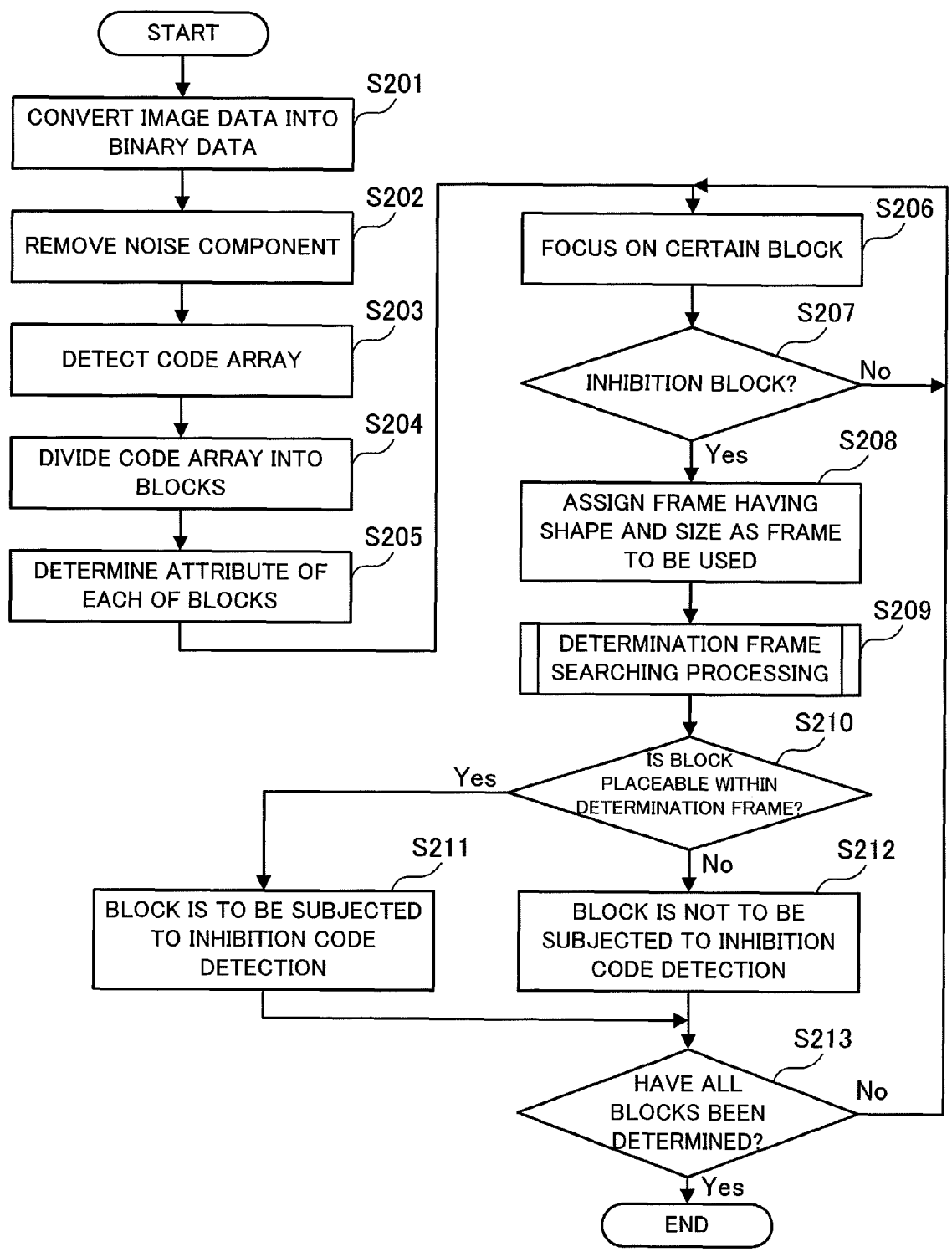
FIG. 9 is a flowchart illustrating an operation example of the inhibition block determination part.

FIG. 9 is a flowchart illustrating an operation example of the inhibition block determination part 13.

In the inhibition block determination part 13, the binary converting portion 21 converts inputted image data into binary data (step 201), the noise removing portion 22 removes a noise component from the binary data (step 202), the code array detection portion 23 detects a code array in the binary data from which the noise component has been removed (step 203), the block dividing portion 24 divides the code array into blocks (step 204). The processing in steps 201 to 204 is the same as the processing in steps 101 to 104 shown in FIG. 4; therefore, a detailed description of the processing in steps 201 to 204 is omitted.

Furthermore, in the inhibition block determination part 13, the block attribute determining portion 25 determines whether each of the blocks is the inhibition block 0, the inhibition block 1, or the condition block as the attribute thereof (step 205). The processing in step 205 is the same as the processing in step 106 in FIG. 4; accordingly, a detailed description of the processing in step 205 is omitted.

Thereafter, the block attribute determining portion 25 focuses on a certain block (step 206), and then determines whether the block having been focused on is the inhibition block 0 or the inhibition block 1 (step 207).

As a result, if it is determined that the block having been focused on is neither the inhibition block 0 nor the inhibition block 1, in other words, if the block is the condition block, the operation goes back to step 206 to focus on the next block. On the other hand, if it is determined that the block is either the inhibition block 0 or the inhibition block 1, the frame deciding portion 26 and the attribute comparing portion 27 are permitted to perform processing on the block.

Meanwhile, based on angle information of the pattern image acquired in step 203 when the pattern image is detected by the code array detection portion 23, a skew angle of the block that has been focused on in step 206 is obtainable. Then, the frame deciding portion 26 assigns a frame having a shape and a size set for the skew angle in advance as a frame to be used by the attribute comparing portion 27 (step 208). This frame assignment operation may be performed immediately after step 203.

Thereafter, the attribute comparing portion 27 performs a determination frame searching processing to find a determination frame by shifting, as shown in FIGS. 6A to 6I, the frame on the code arrays (step 209). According to the result of the determination frame searching processing, it is determined whether or not the block is placeable within the determination frame (step 210).

As a result, if it is determined that the block is placeable within the determination frame, the block is to be subjected to the inhibition code detection (step 211). On the other hand, if it is determined that the block is not placeable within the determination frame, the block is not to be subjected to the inhibition code detection (step 212).

Then, lastly, the inhibition block determination part 13 determines whether or not all the blocks in a predetermined region have been determined (step 213). At this point, if there is any block which has not been determined, the operation goes back to step 206, and the same processing is performed on the next block. If all the blocks have been determined, the processing is terminated.

In the following section, a detail description will be given of the determination frame searching processing in step 209 in FIG. 9.

Figure 10:
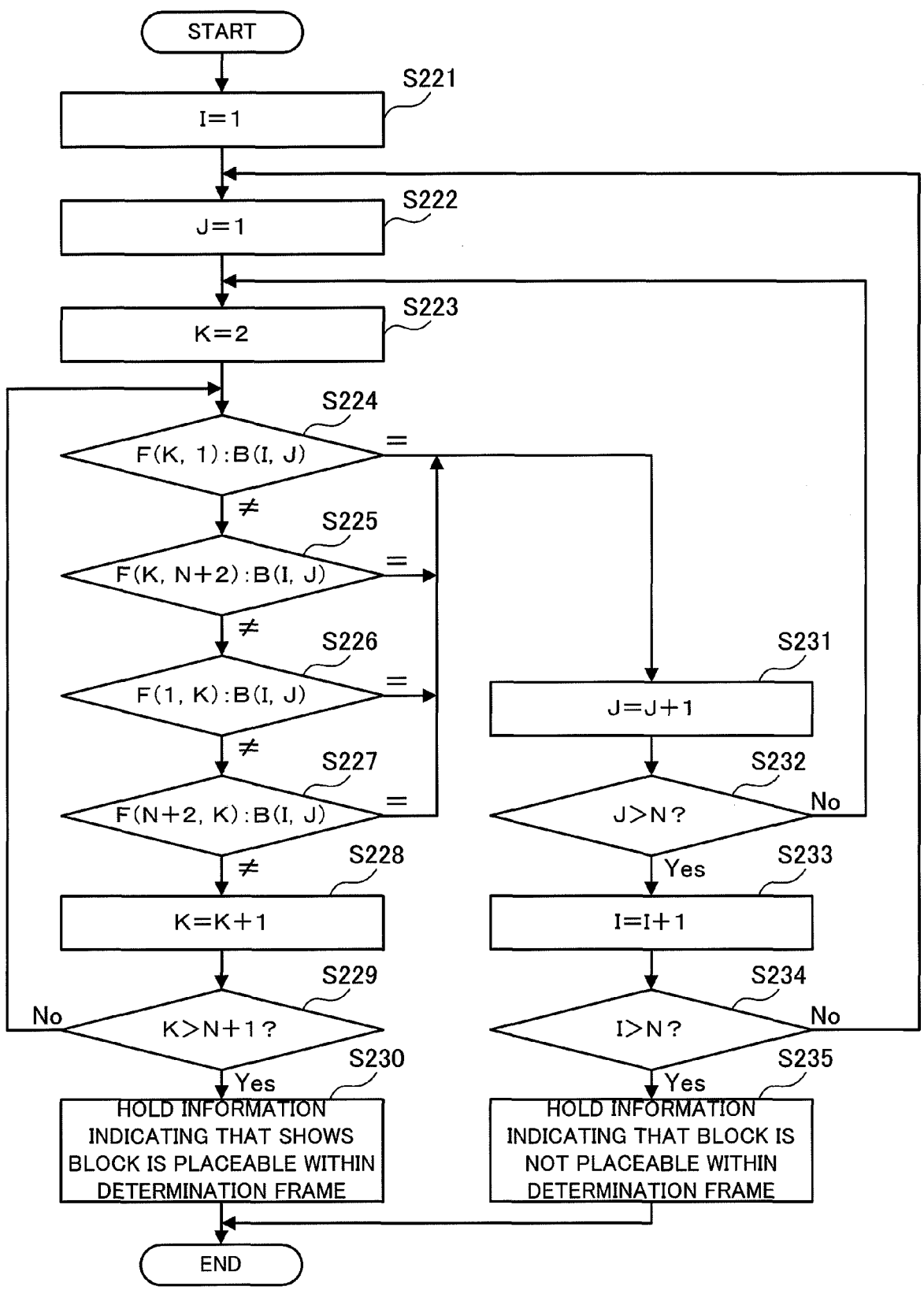
FIG. 10 is a flowchart illustrating an operation example of the attribute comparing portion.

FIG. 10 is a flowchart illustrating an operation example of the attribute comparing portion 27. In this section, a region surrounded by the frame, in other words, a region inside of the inner circumference of the frame (hereinafter referred to as "an inner circumference region"), will be explained as a frame having a size of N blocks by N blocks.

While shifting the frame so that the block having been focused on is located in the position of I-th from the left and J-th from the top in the inner circumference region, the attribute comparing portion 27 searches for a position of the frame constituted by blocks each having a bit value different from the bit value of the block having been focused on.

First, the attribute comparing portion 27 substitutes "1" for an index I which represents a position of the block in the inner circumference region in the transverse direction (step 221), and also substitutes "1" for an index J which represents a position of the block in the inner circumference region in the longitudinal direction (step 222). Then, while shifting (I, J) to (N, N), a processing described below is performed on each (I, J).

In other words, the attribute comparing portion 27 compares the bit value of the block having been focused on and the bit value of each of the blocks constituting the frame.

In the comparison, the attribute comparing portion 27 first substitutes "2" for an index K. Here, the index K represents a position of individual blocks in a region including the inner circumference region and the frame itself, in other words, a region inside the outer circumference of the frame (hereinafter referred to as "an outer circumference region"), in the longitudinal direction or the transverse direction (step 223). Thereafter, while shifting K to N+1, a processing described below is performed on each K.

It should be noted that, in the following section, the bit value of a block located in a position of I-th in the transverse direction and J-th in the longitudinal direction in the inner circumference region is expressed as B (I, J). Likewise, the bit value of a block located in a position of K1-th in the transverse direction and K2-th in the longitudinal direction in the outer circumference region is expressed as F (K1, K2).

First, the attribute comparing portion 27 determines whether or not F (K, 1) is equal to B (I, J) (step 224). If the result shows that F (K, 1) is not equal to B (I, J), it is determined whether or not F (K, N+2) is equal to B (I, J) (step 225). If the result shows that F (K, N+2) is not equal to B (I, J), it is determined whether or not F (1, K) is equal to B (I, J) (step 226). If the result shows that F (1, K) is not equal to B (I, J), it is determined whether or not F (N+2, K) is equal to B (I, J) (step 227). If the result shows that F (N+2, K) is not equal to B (I, J), one (1) is added to K (step 228), and then it is determined whether or not K is greater than N+1 (step 229). If K is not greater than N+1, the operation goes back to step 224. If K is greater than N+1, the block having been focused on is placeable within a determination frame; thus, information indicating that the block having been focused on is placeable within the determination frame is held (step 230).

On the other hand, in any of the comparisons of the bit value of the block having been focused on with the bit value of individual blocks constituting the frame, if both bit values are equal to each other, the block having been focused on is not placeable within the determination frame. Accordingly, the position of the frame is shifted, and then the attribute comparing portion 27 continues to determine whether or not the block is placeable within the determination frame.

In other words, in the cases where it is determined that F (K, 1) is equal to B (I, J) in step 224, where it is determined that F (K, N+2) is equal to B (I, J) in step 225, where it is determined that F (1, K) is equal to B (I, J) in step 226, and where it is determined that F (N+2, K) is equal to B (I, J) in step 227, one (1) is added to J (step 231), and then it is determined whether or not J has exceeded N (step 232). If J has not exceeded N, the operation goes back to step 223. If J has exceeded N, one (1) is added to I (step 233), and then it is determined whether or not I has exceeded N (step 234). If I has not exceeded N, the operation goes back to step 222. If I has exceeded N, information indicating that the block is not placeable within the determination frame is held (step 235), and the operation is terminated.

[Second Determination Method]

Figure 11:
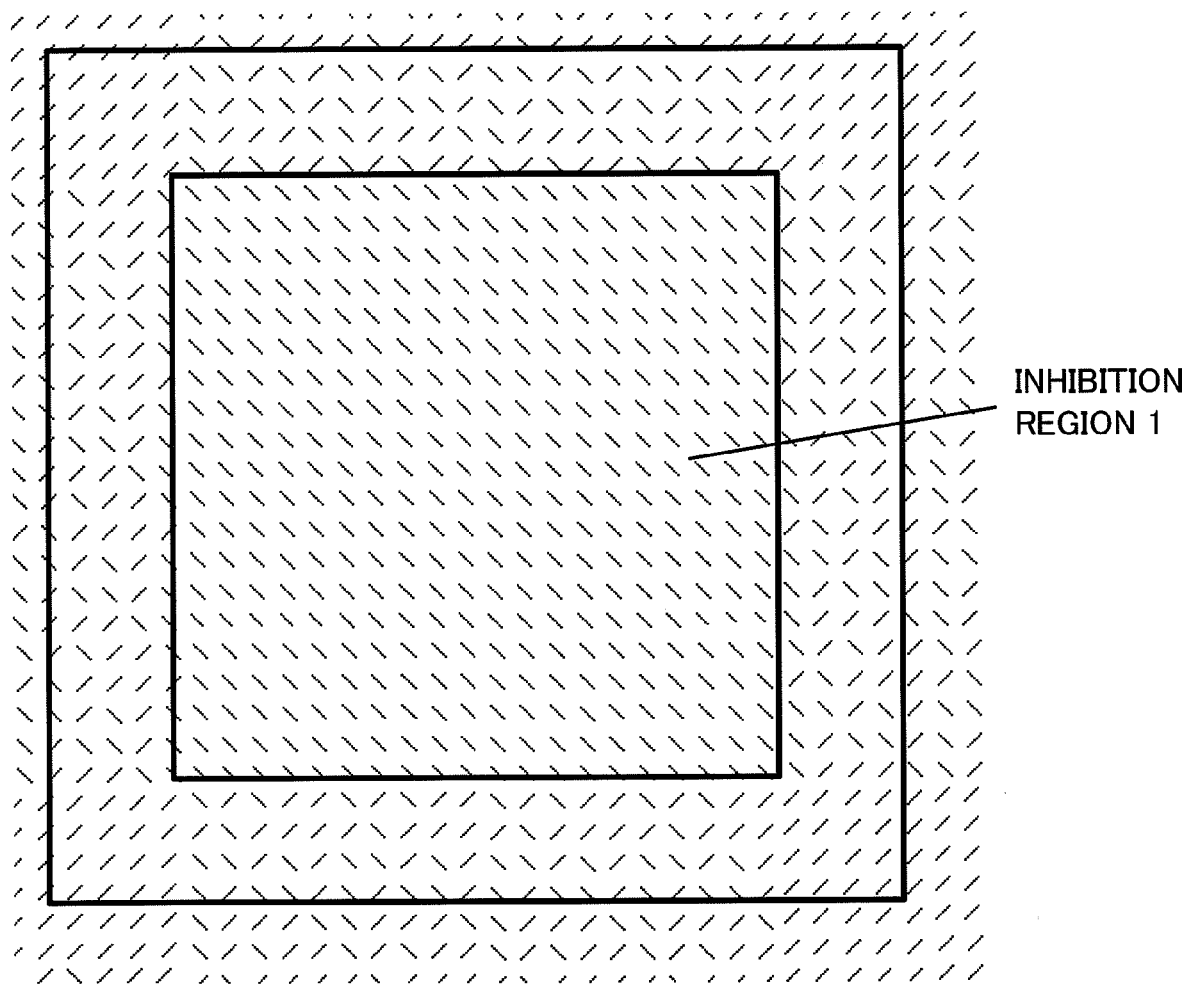
FIG. 11 is a diagram concretely illustrating an outline of a second determination method.

FIG. 11 is a diagram concretely illustrating an outline of a second determination method.

This figure also illustrates a portion having the inhibition region 1 as a center in the layout illustrated in FIG. 2. It should be noted that the bit values for the blocks each of which is smaller than the control region are not obtained for comparison therebetween in this second determination method; therefore, the blocks are not shown in the figure. In this figure, a determination frame surrounding the inhibition region 1 is indicated by solid lines. Accordingly, the region surrounded by the inner solid lines and the outer solid lines is a region of the determination frame (hereinafter referred to as "a framed region").

In the second determination method, the ratio of bits "0" and the ratio of bits "1" in the inner circumference region are first calculated. In the meantime, the ratio of bits "0" and the ratio of bits "1" in the framed region are also calculated. Then, in the case where the ratio of bits "0" in the inner circumference region is equal to or greater than a threshold value, and the ratio of bits "0" in the framed region is equal to or less than a threshold value, or in the case where the ratio of bits "1" in the inner circumference region is equal to or greater than a threshold value, and the ratio of bits "1" in the framed region is equal to or less than a threshold value, the inner circumference region is placeable within the determination frame; thus, it is determined that the inner circumference region is the inhibition region. However, such determination is merely one example. Accordingly, it may be determined that the inner circumference region is the inhibition region in the case where a difference between the ratio of bits "0" in the inner circumference region and the ratio of bits "0" in the framed region is equal to or greater than a predetermined reference level, or in the case where a difference between the ratio of bits "1" in the inner circumference region and the ratio of bits "1" in the framed region is equal to or greater than a predetermined reference level. It should be noted that the determination frame in the second determination method refers to a frame with which a difference between the ratios in these two regions is equal to or greater than a predetermined reference level.

In addition, in the second determination method, a shape of the frame may be changed depending on a skew angle of an original document.

Here, a description will be given of the inhibition block determination part 13 in the case where the second determination method is adopted.

Figure 12:
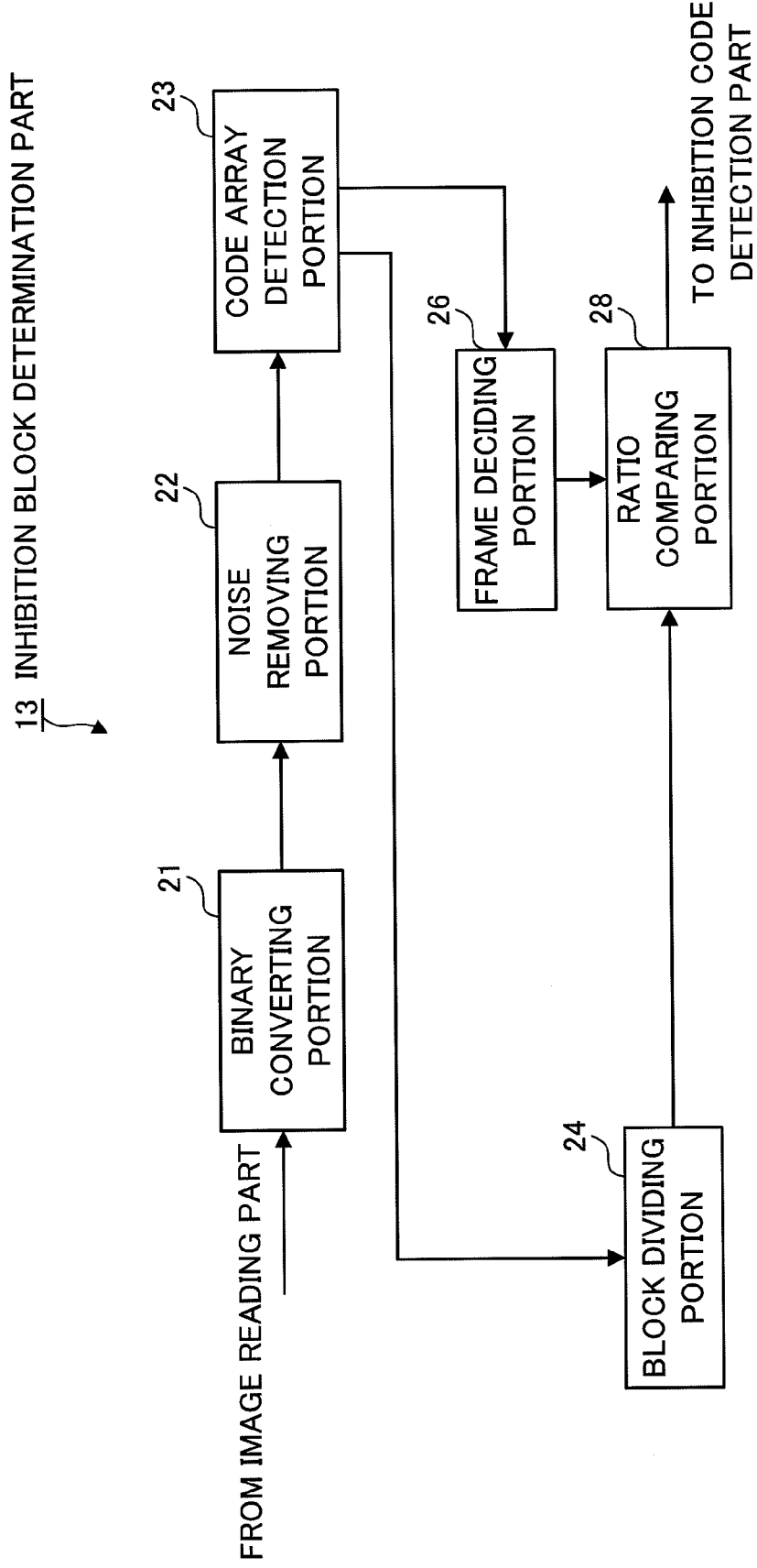
FIG. 12 is a block diagram illustrating a configuration example of the inhibition block determination part in this case.

FIG. 12 is a block diagram illustrating a configuration example of the inhibition block determination part 13 in this case.

As shown in the figure, the inhibition block determination part 13 is provided with a binary converting portion 21, a noise removing portion 22, a code array detection portion 23, a block dividing portion 24, a frame deciding portion 26 and a ratio comparing portion 28.

The binary converting portion 21, the noise removing portion 22, the code array detection portion 23, the block dividing portion 24, and the frame deciding portion 26 are the same as those illustrated in FIG. 8; thus, a detailed description thereof is omitted.

The ratio comparing portion 28, while scanning, on code arrays, the frame determined by the frame deciding portion 26, determines whether or not a target region is placeable within a determination frame by comparing the ratio of a bit value in the target region and the ratio of the bit value in the framed region. Then, the ratio comparing portion 28 outputs a determination result to the inhibition code detection part 14. In the present exemplary embodiment, the ratio comparing portion 28 is provided as an example of a determination unit that determines whether or not a specified region is to be subjected to a predetermined processing.

In the following section, the operation of the inhibition block determination part 13 will be described.

Figure 13:
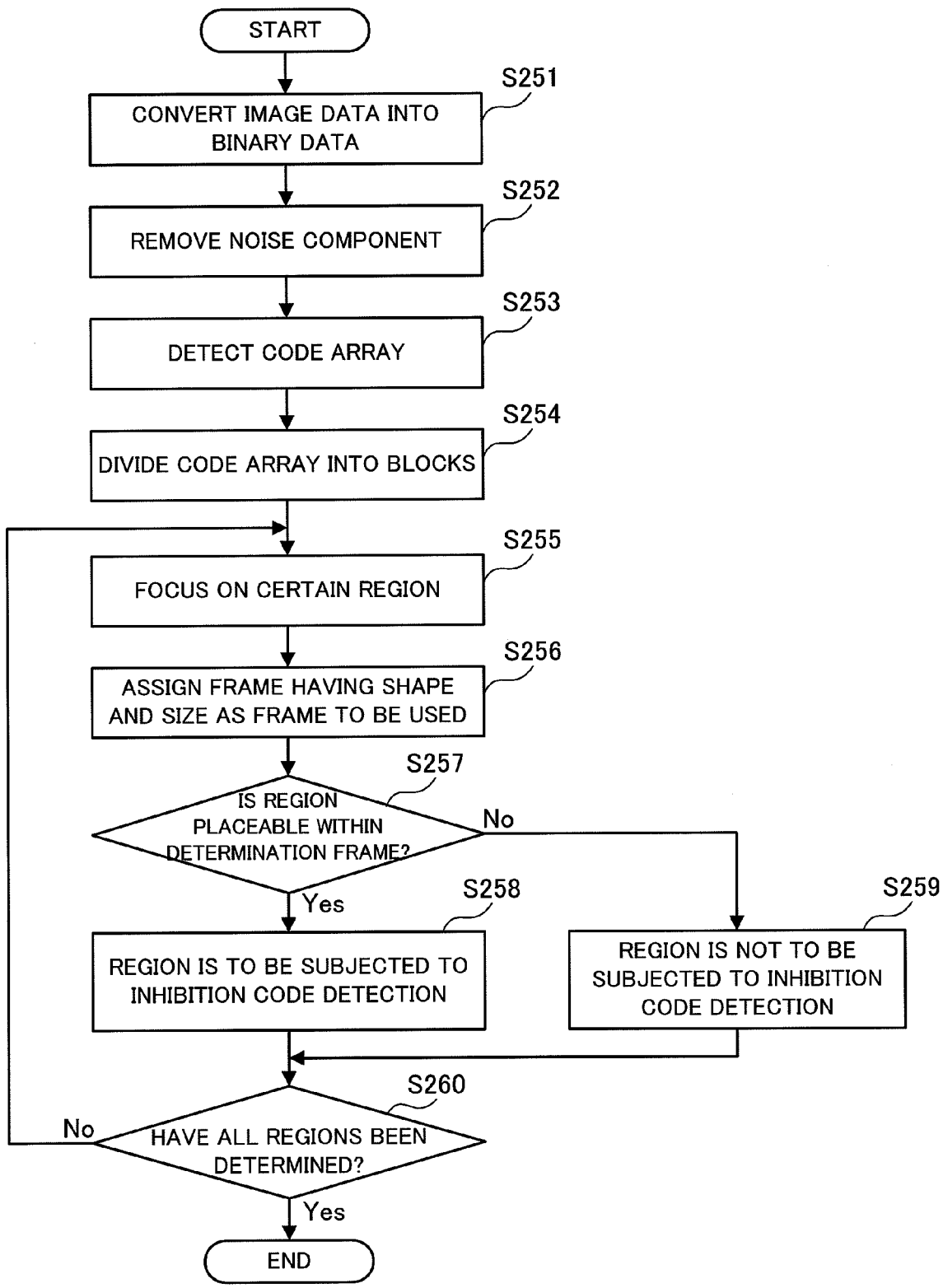
FIG. 13 is a flowchart illustrating an operation example of the inhibition block determination part.

FIG. 13 is a flowchart illustrating an operation example of the inhibition block determination part 13.

In the inhibition block determination part 13, the binary converting portion 21 converts inputted image data into binary data (step 251), the noise removing portion 22 removes a noise component from the binary data (step 252), the code array detection portion 23 detects a code array in the binary data from which the noise component has been removed (step 253), and the block dividing portion 24 divides the code array into blocks (step 254). The processing in steps 251 to 254 is the same as the processing in steps 101 to 104 shown in FIG. 4; therefore, a detailed description of the processing in steps 251 to 254 is omitted.

Additionally, in the inhibition block determination part 13, the block dividing portion 24 focuses on a certain region by referring to partitions of the individual blocks (step 255).

Meanwhile, based on angle information of the pattern image acquired in step 253 when the pattern image is detected by the code array detection portion 23, a skew angle of the region that has been focused on in step 255 is obtainable. Then, the frame deciding portion 26 assigns a frame having a shape and a size set for the skew angle in advance as a frame to be used by the ratio comparing portion 28 (step 256). This frame assignment operation may be performed immediately after step 253.

Thereafter, the ratio comparing portion 28 determines whether or not the region having been focused on is placeable within a determination frame (step 257).

As a result, if it is determined that the region is placeable within the determination frame, the region is to be subjected to the inhibition code detection (step 258). On the other hand, if it is determined that the region is not placeable within the determination frame, the region is not to be subjected to the inhibition code detection (step 259).

Then, lastly, the inhibition block determination part 13 determines whether or not all the regions in a predetermined region have been determined (step 260). At this point, if there is any region which has not been determined, the operation goes back to step 255, and the same processing is performed on the next region. If all the regions have been determined, the processing is terminated.

In the above description, the above-described processing is to be performed in the copying apparatus 10. However, the present exemplary embodiment is not limited to such a case. For example, the above-described processing may be executed in a general-purpose computer 90.

Figure 14:
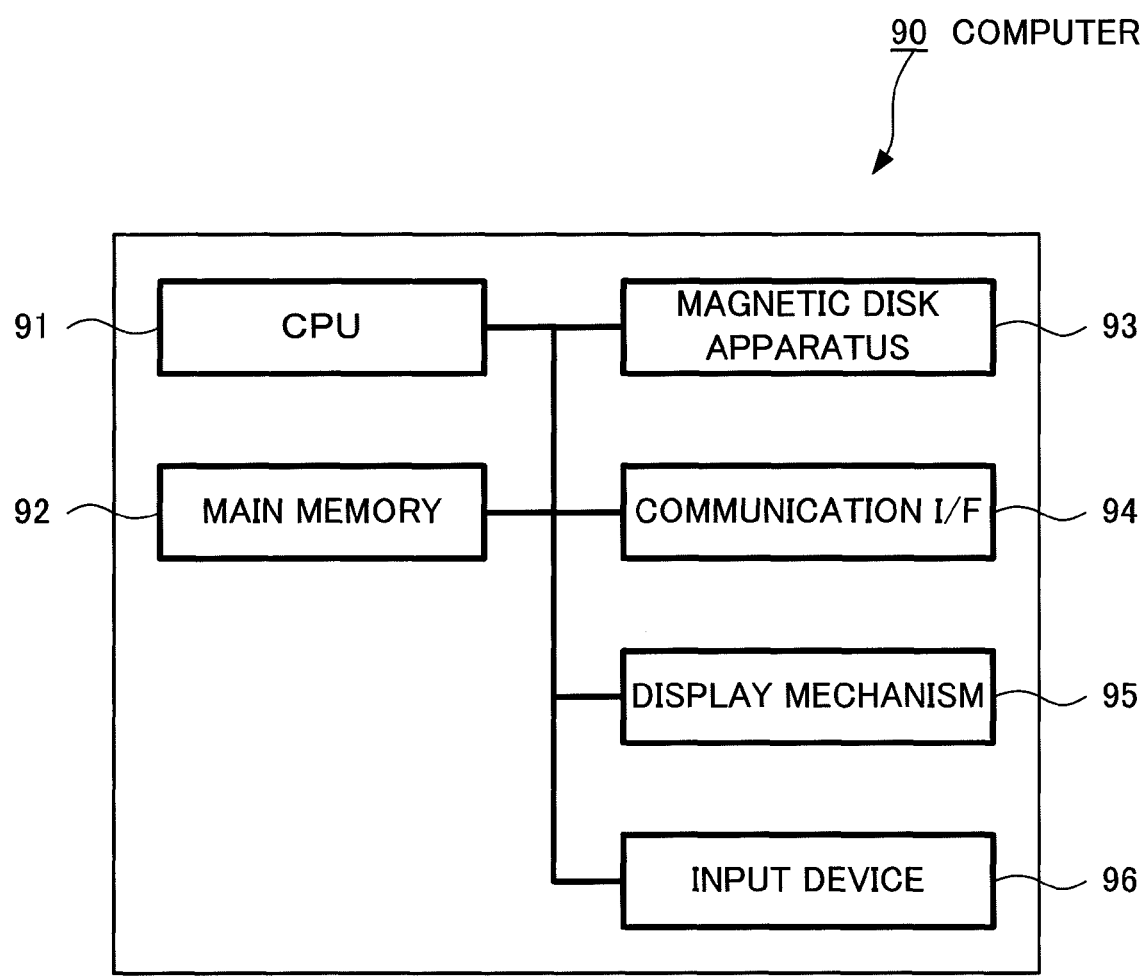
FIG. 14 is a diagram illustrating a hardware configuration of the computer.

FIG. 14 is a diagram illustrating a hardware configuration of the computer 90.

As shown in the figure, the computer 90 is provided with a central processing unit (CPU) 91 as a computing unit, and a main memory 92 and a magnetic disk apparatus (HDD: hard disk drive) 93 that are a memory. Here, the CPU 91 executes an operating system (OS) and a various kinds of software such as application, and realizes the above-described respective functions. The main memory 92 is a memory area that stores various kinds of software, data used for the execution thereof, and the like. The magnetic disk apparatus 93 is a memory area that stores input data to the various kinds of software, output data from the various kinds of software, and the like.

Further, the computer 90 is provided with a communication I/F 94 that performs communication with the exterior, a display mechanism 95 including a video memory, a display and the like, and an input device 96 such as a keyboard, a mouse or the like.

The program that realizes the present exemplary embodiment may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
    an acquisition unit that acquires a read-out image read out by an image reading apparatus;
    a detection unit that detects, from the read-out image acquired by the acquisition unit, an embedded image including a first specified image having a first shape and a second specified image having a second shape;
    an adding unit that adds attribute information to a specified region in the embedded image detected by the detection unit, in accordance with an appearance ratio of the first specified image in the specified region, and that adds attribute information to other region surrounding the specified region in the embedded image detected by the detection unit, in accordance with an appearance ratio of the first specified image in the other region; and
    a determination unit that determines whether or not the specified region is to be subjected to a predetermined processing using the first specified image on the basis of whether or not the attribute information added to the specified region corresponds to the attribute information added to the other region.

2. The image processor according to claim 1, wherein the determination unit determines that the specified region is to be subjected to the predetermined processing in the case where the attribute information added to the specified region does not correspond to the attribute information added to the other region.

3. The image processor according to claim 1, wherein the determination unit determines that the specified region is not to be subjected to the predetermined processing in the case where the attribute information added to the specified region corresponds to the attribute information added to the other region.

4. The image processor according to claim 1, further comprising:
    a calculating unit that calculates a slope of the embedded image detected by the detection unit; and
    a decision unit that decides at least any one of a shape and a size of the other region in accordance with the slope calculated by the calculation unit.

5. An image processor comprising:
    an acquisition unit that acquires a read-out image read out by an image reading apparatus;
    a detection unit that detects, from the read-out image acquired by the acquisition unit, an embedded image including a first specified image having a first shape and a second specified image having a second shape; and
    a determination unit that determines whether or not a specified region in the embedded image detected by the detection unit is to be subjected to a predetermined processing using the first specified image on the basis of whether a difference between an appearance ratio of the first specified image in the specified region and an appearance ratio of the first specified image in other region surrounding the specified region is equal to or greater than a predetermined reference level.

6. The image processor according to claim 5, wherein the determination unit determines that the specified region is to be subjected to the predetermined processing in the case where the appearance ratio of the first specified image in the specified region is equal to or greater than a first threshold value, and the appearance ratio of the first specified image in the other region is equal to or less than a second threshold value that is less than the first threshold value.

7. The image processor according to claim 5, wherein the determination unit determines that the specified region is not to be subjected to the predetermined processing in the case except that the appearance ratio of the first specified image in the specified region is equal to or greater than a first threshold value and the appearance ratio of the first specified image in the other region is equal to or less than a second threshold value that is less than the first threshold value.

8. An image forming apparatus comprising:
    a reading unit that reads out an image including a first specified image having a first shape and a second specified image having a second shape from a medium having the image printed thereon;
    a detection unit that detects one or more regions each having an appearance ratio of the first specified image equal to or greater than a first reference level from regions in the image read out by the reading unit;
    a restricting unit that restricts the image read out by the reading unit from being printed on other medium in the case where the number of the regions detected by the detection unit is equal to or greater than a second reference level; and
    a determination unit that determines whether or not a specified region in the image read out by the reading unit is to be subjected to the detection by the detection unit on the basis of whether or not attribute information added to the specified region in accordance with an appearance ratio of the first specified image in the specified region corresponds to attribute information added to other region surrounding the specified region in the image read out by the reading unit in accordance with an appearance ratio of the first specified image in the other region.

9. An image processing method comprising:
    acquiring a read-out image read out by an image reading apparatus;
    detecting, from the acquired read-out image, an embedded image including a first specified image having a first shape and a second specified image having a second shape;
    adding attribute information to a specified region in the detected embedded image in accordance with an appearance ratio of the first specified image in the specified region, and adding attribute information to other region surrounding the specified region in the detected embedded image in accordance with an appearance ratio of the first specified image in the other region; and
    determining whether or not the specified region is to be subjected to a predetermined processing using the first specified image on the basis of whether or not the attribute information added to the specified region corresponds to the attribute information added to the other region.

10. A non-transitory computer readable medium storing a program causing a computer to execute a process for detecting a specified image used for a predetermined processing, the process comprising:
    acquiring a read-out image read out by an image reading apparatus;
    detecting, from the acquired read-out image, an embedded image including a first specified image having a first shape and a second specified image having a second shape;
    adding attribute information to a specified region in the detected embedded image in accordance with an appearance ratio of the first specified image in the specified region, and adding attribute information to other region surrounding the specified region in the detected embedded image in accordance with an appearance ratio of the first specified image in the other region; and determining whether or not the specified region is to be subjected to a predetermined processing using the first specified image on the basis of whether or not the attribute information added to the specified region corresponds to the attribute information added to the other region.

* * * * *